United States Patent [19]

Snodgrass

[11] Patent Number: 4,855,844
[45] Date of Patent: Aug. 8, 1989

[54] METHOD OF PRERECORDING TAPE AND APPARATUS FOR USE THEREWITH

[76] Inventor: Michael Snodgrass, 550 Slayton, Grand Haven, Mich. 49417

[21] Appl. No.: 667,642

[22] Filed: Nov. 2, 1984

[51] Int. Cl.$^4$ .......................... G11B 5/02; G11B 15/12
[52] U.S. Cl. ........................................ 360/22; 360/63
[58] Field of Search .................. 360/22, 74.1, 61, 63, 360/55

[56] References Cited

U.S. PATENT DOCUMENTS

| | | | |
|---|---|---|---|
| 3,315,041 | 4/1967 | Sampson | 360/63 |
| 3,911,487 | 10/1975 | Ladriere | 360/63 |
| 4,054,926 | 10/1977 | Haynes | 360/72 |
| 4,121,264 | 10/1978 | Kishi | 360/55 |
| 4,139,954 | 2/1979 | Yamamoto | 35/8 |
| 4,215,377 | 7/1980 | Norris | 360/73 |
| 4,354,841 | 10/1982 | Meeder | 434/157 |
| 4,388,656 | 6/1983 | Lemke | 360/22 |
| 4,445,150 | 4/1984 | Nakajima et al. | 360/22 |
| 4,525,755 | 6/1985 | Meek | 360/65 |

*Primary Examiner*—Vincent P. Canney
*Attorney, Agent, or Firm*—Price, Heneveld, Cooper & DeWitt

[57] ABSTRACT

A method of recording a stereo audio tape having a pair of stereo tracks on each side with a monaural signal of sequence dependent information, and a tape produced thereby. The sequence dependent information is divided into four quarters with the first and second quarters being recorded onto one stereo channel on the two sides of the tape, and the third and fourth quarters being recorded on the other stereo channel on the two sides of the tape. The entire monaural recording is replayed by adjusting the balance control only once during the course of replaying the tape. An adaptor device is provided to adapt stereo systems without balance controls to the replaying of the prerecorded tape.

5 Claims, 1 Drawing Sheet

METHOD OF PRERECORDING TAPE AND APPARATUS FOR USE THEREWITH

BACKGROUND OF THE INVENTION

The present application relates to the prerecording of audio tape, and in particular to a method of prerecording sequence dependent information onto an audio tape monaurally, as well as an apparatus for use therewith.

Various magnetic audio recording tapes and tape cassettes are conventionally known in the art. Typically, such audio tapes are used with a stereophonic tape recording and playing device in order to produce a multi-track tape that reproduces stereophonic sound. Normally, such conventional stereo tape recording and replay equipment include a reel mechanism that advances the tape past a split pick-up head. The pick-up head simultaneously reads two adjacent magnetic tracks of encoded information on the tape, each track corresponding to one channel of the stereophonic signal. Since the pick-up head either simultaneously records or replays the two adjacent tracks, complementary signals are encoded on each track or channel so as to be harmoniously mixed during replaying of the tape. Normally, the audio tape includes two pair or four separate recording tracks. This allows the tape to be played in each direction, with two adjacent tracks being dedicated to the two stereo channels in each direction.

Most conventional audio tape players utilize one of two methods to select the direction of tape play or advancement and the particular pair of tracks to be played. In one class of tape playing devices the split pick-up head maintains a single orientation. The tape is sufficiently wide that when the tape is loaded into the playing device only two of the tracks adjacent one edge of the tape are accessed by the pick-up head. In order to change the tracks to be played the tape must be manually removed from the player unit, turned over and reinserted for play in the opposite direction. In the second class of tape playing devices, the pick-up head itself is rotated and shifted within the device so as to be inverted and access the unplayed pair of tracks. The direction of tape travel or advancement within the device is also reversed.

Heretofore magnetic audio tapes have been prerecorded with two monaural signals on two adjacent tracks in the same direction. Such prerecorded tapes find use in certain specific applications, for example, in foreign language instruction and the like. The English material or questions are recorded on one track separated by silent pauses, while the foreign language counterpart is recorded on the second track at the locations corresponding to the pauses. With such a prerecorded tape the user may listen to the tape in a conventional fashion to hear the English phrase followed immediately by the foreign language counterpart. However, the user may also operate the balance control of the stereo tape player in order to select a single track or channel to be played. By setting the balance to produce a maximum volume on one channel and a minimum volume on the other, the student can select either the English phrase or the foreign language counterpart only to be replayed.

In other applications conventional stereo audio tapes have been recorded with monaural information on the adjacent tracks normally used to record stereophonic information. For example, verbal material has been recorded on one track, such as a foreign language, while background sounds or music relating to the verbal material is recorded on the second track. The two tracks can therefore be replayed simultaneously with the background sounds complementing the spoken information. Stereophonic audio tapes have also been prerecorded with background music on four separate tracks to be used in the replaying of monaural background music in stores and the like.

Heretofore, however, there has not been available a method of prerecording audio tapes that substantially increases the storage capacity of the tape with sequence dependent or serialized information and which also permits the replaying of the entire tape with a minimal amount of control adjustment.

SUMMARY OF THE INVENTION

The present invention provides for the storage on a prerecorded audio tape a relatively lengthy amount of sequence dependent or serialized information that is not required to be replayed stereophonically. Further, the invention provides for a method and apparatus for use therewith that permits the replaying of such a prerecorded tape with a minimal number of tape player control adjustments.

The method includes dividing the continuously running, sequence dependent information, such as colloquy, drama or the like into four consecutive quarters. The information is prerecorded onto four tracks of the tape so that the first quarter is recorded in one direction on the track corresponding to the first stereo channel. The second quarter is recorded in the reverse direction on the same stereo channel, so that the first quarter proceeds into the second quarter serially without a change in the stereo player balance control or the like. The third quarter is recorded in the original direction on the track corresponding to the second stereo channel, while the fourth quarter is recorded in the reverse direction on the same stereo channel. The third quarter therefore proceeds serially into the fourth quarter without a change in the balance control. When replaying prerecorded audio tape, the entire tape may therefore be replayed with only a single change in stereo channel selection after the second quarter has been completed.

Additionally, the method preferably includes spacing the tracks of prerecorded material across the tape width in order to provide guard bands between adjacent tracks that reduce spurious signals or cross-talk from adjacent tracks. These guard bands are preferably encoded with a masking signal to further reduce spurious signals from adjacent tracks.

The invention also provides an adaptor device that introduces a stereo channel or track selection control into a conventional stereo tape player device. The adaptor device mates with a conventional stereo tape player output and speaker assembly input, and includes a switching circuit that selectively applies only one stereo channel from the stereo tape player device to the speakers.

Although audio stereo tapes have previously been monaurally prerecorded on the various tracks, such tapes have not been prerecorded with sequence dependent information. Such tapes have been recorded with short phrases, compilations of music and the like so that the sequence of reply of the material is not important to its understanding. For this reason these methods of prerecording the tape do not accommodate the sequential replay of all of the information on the tape without an increased number of control adjustments and/or rewinding of the tape. In contradistinction the present method provides for serialized replay of all of the information on the tape with a minimum number of control adjustments and without rewinding the tape.

These and other features, objects and advantages of the invention will be recognized by one skilled in the art from the written disclosure which follows and the drawings referenced herein.

DETAILED DESCRIPTION OF THE PREFERRED EMBODIMENTS

Figure 1:
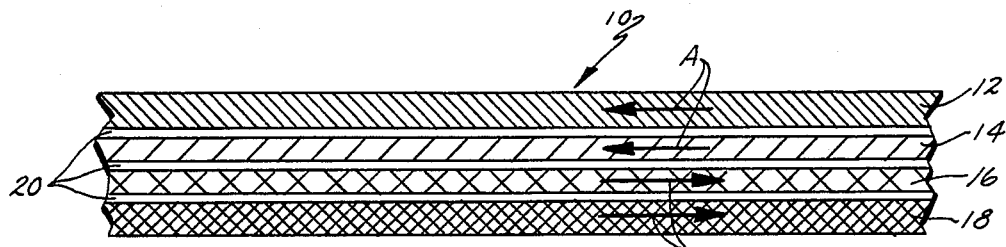
FIG. 1 is a fragmentary, schematic view of a magnetic audio tape prerecorded according to the method of the present invention.

A preferred embodiment of the invention is shown in FIG. 1 as a prerecorded, magnetic audio tape referenced generally by the numeral 10. Tape 10 includes four tracks 12, 14, 16 and 18 on which are prerecorded sequentially dependent or serialized information. Each track is monaurally prerecorded, so that the adjacent tracks do not contain complementary audio material such as is found in a stereophonic recording. Since tracks 12-18 contain noncomplementary information, the tracks are spaced by guard bands 20 which reduce spurious signals from adjacent tracks during replay. Both during the prerecording of tape 10 and during the replay thereof, tape 10 is used with conventional stereophonic recording or playing equipment. The balance control of the stereo equipment is adjusted such that only a single track is encoded or played at a time. Tracks 12-18 are prerecorded in a specific sequence described below such that the entirety of the material prerecorded on all four tracks may be replayed with only a single adjustment of the balance control or stereo channel selection of the stereo equipment.

Figure 2:
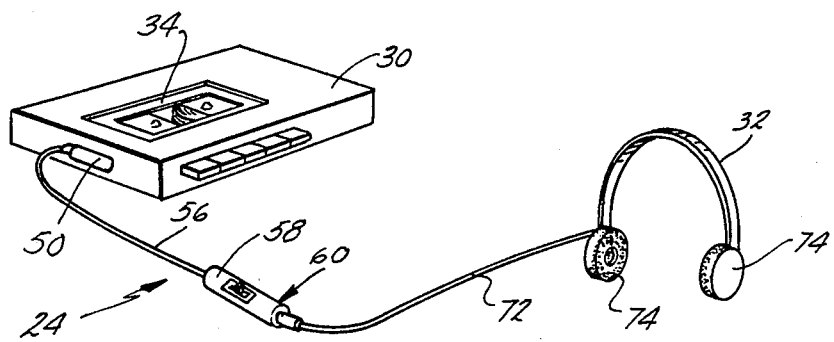
FIG. 2 is a perspective view of a stereophonic tape player and headphone speaker system shown in combination with an adaptor device embodying the present invention.
Figure 3:
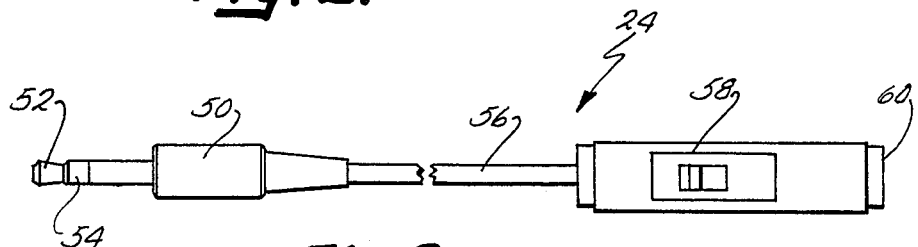
FIG. 3 is a fragmentary, plan view of the adaptor of FIG. 2.

As shown in a preferred embodiment of FIGS. 2 and 3, a stereo adaptor or converter device is referenced generally by the numeral 24. As shown in FIG. 2, adaptor 24 connects to a conventional stereo tape player 30 and speaker system 32. Adaptor 24 is preferably used to adapt a tape player 30 without a balance control to the replaying of tape 10 prerecorded according to the method disclosed herein. Adaptor 24 is also utilized with conventional stereo tape players having balance controls to provide an alternate, quick and readily accessible adjustment control that obviates the need for adjustment of the tape player's balance control.

More specifically, in reference to FIG. 1, tracks 12-18 are spaced across the width of tape 10 so as to correspond to the location of a conventional split pick-up head (not shown) on a stereo tape recorder or player. Tracks 12-18 are grouped into two pairs of tracks, each pair corresponding to the two channels of a conventional stereophonic tape recorder or player. One pair of adjacent tracks, tracks 12 and 14, are located on tape 10 so as to correspond to the location of the split pick-up head when tape 10 is advanced through the tape recorder or player device in a direction indicated by arrows "A". The other pair of adjacent tracks, tracks 16 and 18, are located on tape 10 so as to correspond to the location of the split pick-up head when tape 10 is advanced in a direction indicated by arrows "B". Due to the manner in which tape play direction is reversed in conventional tape player devices, the outermost tracks 12 and 18 correspond to one stereophonic channel, such as the left channel, running in opposite directions, while the two inner tracks 14 and 16 correspond to the other, such as the right channel, running in opposite directions. This permits the direction of advancement of tape 10 to be reversed simply by removing tape 10 from the tape player, inverting tape 10 and reinserting tape 10 in the tape player. Alternatively, conventional automatically reversing stereo tape players physically rotate the split pick-up head 180 degrees, and therefore access the same pattern of tracks 12-18.

Sequence dependent information is monaurally recorded upon tracks 12-18. Sequence dependent or serialized information refers to colloquy, drama or the like. Exemplary of such sequence dependent information is the reading or dramatization of literary works. Sequence dependent information is characterized by its dependence upon consecutive rendition in order to be understandable, unlike compilations of unrelated music, songs, foreign language phrases or the like.

The sequence dependent information to be recorded is divided into four consecutive quarters or portions. These four quarters are prerecorded onto tape 10 so as to proceed in a logical fashion from the beginning of the information on the first quarter to the termination at the end of the fourth quarter. When recorded according to the method discussed below, a prerecorded tape 10 results having the first quarter portion of material prerecorded onto track 12 in direction of advancement "A" to the end of tape 10. The second quarter portion of information is prerecorded on track 18 in direction "B", so that both the first and second quarter portions are recorded at locations corresponding to the same stereophonic channel. The third quarter portion is prerecorded on track 14 in direction "A". The final quarter portion is prerecorded on track 16 in direction "B", so that the third and final quarter portions are both recorded at locations corresponding to the other stereophonic channel. The sequence for logical replay of tape 10 is therefore tracks 12, 18, 14 and 16.

Tape 10 is prerecorded in the above sequence with the use of conventional audio tape recording equipment (not shown). Tape 10 is preferably mounted on a conventional audio tape cassette 34 (FIG. 2) and placed within the recording device. Tape 10 is advanced through the recording device in direction "A" while the balance control of the recording device is adjusted so that the first quarter portion of information is only recorded onto track 12. The direction of advance of tape 10 is then reversed, either by physically removing tape 10 from the recording device and inverting the tape or alternatively, by rotating the orientation of the split pick-up head. Tape 10 is advanced through the recording device in direction "B" while the balance control remains unchanged so that the second quarter portion is recorded onto track 18. The direction of advance of tape 10 is again reversed and the balance control is adjusted so that the other of the two stereophonic channels is selected. Tape 10 is advanced through the recording device in direction "A" while the third quarter portion is recorded on track 14. The direction of advance of tape 10 is reversed a final time to direction "B", and the balance control is unchanged to prerecord the final quarter portion onto track 16. The entirety of the sequence dependent information is therefore prerecorded onto tape 10 without necessitating the rewinding of the tape and with the requirement of only a single adjustment of the balance control.

Alternatively, if tracks 14 and 16 are designated as corresponding to the first stereo channel, rather than tracks 12 and 18, the sequence of recording and replaying tracks 12-18 is changed, but the method of recording and replaying tape 10 is not changed thereby. The first stereo channel is selected and tape 10 is recorded in the two directions on the two "sides" of tape 10. The other one of the stereo channels is then selected and tape 10 is recorded in the two directions on the two "sides" of tape 10. When tracks 14 and 16 are designated as the first stereo channel the sequence of logical replay of tape 10 is track 14, 16, 12 and 18.

It will be noted that adjacent tracks 12-18 of tape 10 are prerecorded with noncomplementary subject matter. Therefore, any overlap of the tape reading element onto adjacent tracks will cause interference with or cross-talk on the particular track being replayed. Such cross-talk may occur as tape 10 shifts slightly during advancement through the tape playing device, or from strong signals being recorded on adjacent tracks or the like. Tape 10 therefore includes guard bands 20 which separate adjacent tracks 12-18. Guard bands 20 space tracks 12-18 sufficiently so that overlapping of adjacent tracks on the split pick-up head is prevented and thus stray signals are avoided. Preferably guard bands 20 are blank sections of tape, although in alternative preferred embodiments, guard bands 20 include a masking signal encoded thereon.

The masking signals recorded on guard bands 20 either prevent or ameliorate the stray signals between adjacent tracks 12-18. The masking signals are recorded on guard bands 20 in a conventional fashion using conventional equipment used in the commercial production of cassette tapes. The particular masking signal may comprise a variety of alternative signals. One alternative masking signal is a combination of all audible frequencies, commonly referred to as white noise. Another alternative masking signal is a signal of low amplitude and constant or varying frequency, commonly referred to as small noise. Another alternative masking signal is a bias current of a high, unaudible frequency, ranging as high as one hundred thousand hertz. Still another alternative masking signal is music or other complementary sounds associated with the program information on the track being replayed. With such complementary sounds each guard band 20 may be split into two half bands, with the masking signal being prerecorded in different directions on each half band. With any of the above masking signals, the masking signal may be prerecorded onto guard bands 20 during the prerecording of tracks 12-18, or alternatively may be prerecorded either before or after the prerecording of tracks 14-18.

Shown in FIG. 2, tape player 30 is of conventional audio tape cassette playing design but does not include a balance control. Adaptor 24 includes a conventional male 3.5 millimeter stereo plug 50 having two electrical leads 52 and 54 that telescopingly mate with a conventional stereo output jack. Plug 50 is connected by a two wire cable 56 to a cylindrically shaped switch 58. Opening axially inward of the end of switch 58 opposite cable 56 is a conventional 3.5 millimeter stereo jack 60. Stereo jack 60 includes electrical leads 62 and 64 (FIG. 5) that telescopingly mate with a conventional stereo plug. Speaker system 32 as shown in FIG. 2 is implemented as a headset system of conventional design. Speaker system 32 includes a conventional male 3.5 millimeter stereo plug 70 connected by a two wire cable 72 to a pair of headband mounted speakers 74. When assembled, plug 50 on adaptor 24 is telescopingly received in the outlet of tape player 30, while plug 70 on speaker system 32 is telescopingly received in jack 60.

Figure 5:
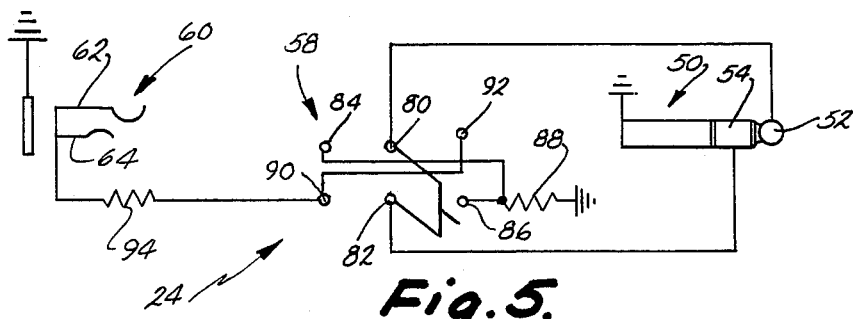
FIG. 5 is a schematic circuit diagram of the adaptor device shown in FIG. 3.
Figure 4:
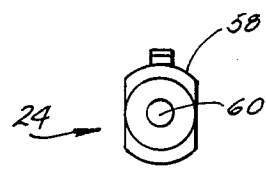
FIG. 4 is an end view of the adaptor device shown in FIG. 3.

As shown schematically in FIG. 5, the circuit of adaptor 24 includes grounded male plug 50 with leads 52 and 54. Leads 52 and 54 are both connected to switch 58, which is a two position, double pole, double throw switch. In the preferred embodiment shown in FIG. 3, switch 58 is implemented with a slide switch. As shown in the schematic of FIG. 5, switch 58 includes a pair of input terminals 80 and 82 that are connected to leads 52 and 54 respectively. On either side of switch 58 an outlet terminal 84, 86 is applied through a resistor 88 to ground. On either side of switch 58 the remaining outlet terminals 90, 92 are both connected through a single lead to a resistor 94, which is applied to both outlet leads 62 and 64 of jack 60.

In operation, switch 58 applies the signal from one of plug leads 52 and 54 to both outlet leads 60 and 64, while the signal from the other of plug leads 52, 54 is applied to resistor 88. Preferably resistor 88 ranges between eight and sixty-five Ohms at one-quarter watt or less. Resistor 94 ranges between zero to thirty Ohms at one-quarter watt or less.

In order to review the entire tape with adaptor 24 connected to tape player 30 and speaker system 32, the operator is only required to first advance both sides of tape 10 through the player with switch 58 set to select the first stereo channel. Switch 58 is then adjusted to select the second stereo channel and both sides of tape 10 are again advanced through player 30. If tape player 30 is provided with an automatic reverse play function, all that is required is to adjust switch 58 once after both sides of tape 10 have been sequentially played one time.

It is to be understood that the above is merely a description of the preferred embodiment, and one skilled in the art will recognize that various modifications or improvements may be made without departing from the spirit of the invention disclosed therein. The scope of the protection afforded is to be determined by the claims which follow and the breadth of protection that the law allows.

The embodiments of the invention in which an exclusive property or privilege is claimed are as follows:

1. An adaptor device for use with a conventional stereo tape playing assembly that complementarily, simultaneously produces both channels of a stereophonic signal in order to permit use of the stereo tape playing assembly to reproduce noncomplementary monaural signals carried on both said channels, said adaptor device being selectively separable from said tape playing assembly and said tape playing assembly having a signal outlet that includes a first outlet lead for one of said stereo channels and a second outlet leads for the other of said stereo channels, said outlet adapted for connection to a speaker assembly signal input, said speaker assembly signal input having a first speaker lead adapted for mating with said first outlet lead and a second speaker lead adapted for mating with said second outlet lead to simultaneously broadcast both said stereo channels, comprising:

a tape player connector adapted for connection to said tape playing assembly signal outlet, said tape player connector including a first adaptor lead located to mate with said first outlet lead and a second adaptor lead located to mate with said second outlet lead when said tape player connector is connected to said outlet;

a speaker connector adapted for connection to said speaker assembly signal input, said speaker connector including a third adaptor lead located to mate with said first speaker lead and a fourth adaptor lead located to mate with said second speaker lead when said speaker connector is connected with said input;

means for selectively switching said first adaptor lead into operative electrical communication with at least one of said third and fourth adaptor leads and for selectively switching said second adaptor lead into operative electrical communication with at least one of said third and fourth adaptor leads, whereby when said tape player connector is operatively connected to said tape playing assembly signal outlet and said speaker connector is operatively connected to said speaker assembly signal input, an operator is provided with the ability to selectively broadcast one of said stereo channels individually by operating said switching means.

2. The adaptor device of claim 1, wherein:
said switching means includes means for selectively switching said first adaptor lead into operative, electrical communication with both said third and fourth adaptor leads simultaneously and for selectively switching said second adaptor lead into operative, electrical communication with both said third and fourth adaptor leads simultaneously.

3. The adaptor device of claim 2, wherein:
said switching means includes means for disconnecting one of said first and second adaptor leads from operative, electrical communication with both said third and fourth adaptor leads when the other of said first and second adaptor leads is switched into operative, electrical communication with at least one of said third and fourth adaptor leads.

4. The adaptor device of claim 3, wherein:
said tape player connector is a male stereo plug and said speaker connector is a female stereo jack.

5. A kit for producing monaural signals with a stereo tape playing device that produces both a first channel and a second channel of a stereo signal, said tape playing device having means for reading said first stereo channel, means for reading said second stereo channel, a signal outlet that includes a first outlet lead for said first stereo channel and a second outlet lead for said second stereo channel, said outlet adapted for connection to a speaker assembly signal input having a first speaker lead adapted for mating with said first outlet lead and a second speaker lead adapted for mating with said second outlet lead to complementarily, simultaneously broadcast both said stereo channels, comprising:

an adaptor device selectively separable from said tape player comprising, (a) a tape player connector adapted for connection to said tape playing device signal outlet, said tape playing connector including a first adaptor lead located to mate with said first outlet lead and a second adaptor lead located to mate with said second outlet lead when said tape player connector is connected with said signal outlet, (b) a speaker connector adapted for connection to said speaker assembly signal input, said speaker connector including a third adaptor lead located to mate with said first speaker lead and a fourth adaptor lead located to mate with said second speaker lead when said speaker connector is connected with said input, (c) switch means for selectively switching said first adaptor lead into operative electrical communication with at least one of said third and fourth adaptor leads; and a tape having a monaural signal prerecorded thereon on four tracks, said monaural signal being prerecorded, (a) in a first direction on a first of said tracks, said first track being at a location along said tape width corresponding to said first stereo channel reading means, (b) in a second direction opposite said first direction on a second of said tracks, said second track being at a location along said tape width corresponding to said first stereo channel reading means, (c) in said first direction on a third of said tracks, said third track being at a location along said tape width corresponding to said second stereo channel reading means, (d) in said second direction on a fourth of said tracks, said fourth track being at a location along said tape width corresponding to said second stereo channel reading means, whereby when said adaptor device is operably connected to said tape playing device and a speaker assembly, said monaural signal may be replayed by operating said switch means to switch said first adaptor lead into communication with at least one of said third and fourth adaptor leads and advancing said tape in said first direction followed by advancing said tape in said second direction, then operating said switch means to switch said second adaptor lead into communication with at least one of said third and fourth adaptor leads and advancing said tape in said first direction followed by advancing said tape in said second direction.

* * * * *

UNITED STATES PATENT AND TRADEMARK OFFICE
CERTIFICATE OF CORRECTION

PATENT NO. : 4,855,844

DATED : August 8, 1989

INVENTOR(S) : Michael Snodgrass

It is certified that error appears in the above-identified patent and that said Letters Patent is hereby corrected as shown below:

Column 2, line 42
after "replaying" insert therefor --the--.

Column 2, line 50
delete "further reduce" and insert --mask--.

Column 4, line 12
after "other" insert --stereophonic channel--.

Column 5, line 39
delete "either prevent or".

Column 5, line 40
delete "The masking signals are recorded on guard bands 20 in a conventional fashion using conventional equipment used in the commercial production of cassette tapes.".

Column 8, line 24
after "leads" insert therefor --and for selectively switching said second adaptor lead into operative electrical communication with at least one of said third and fourth adaptor leads.--.

Signed and Sealed this

Tenth Day of December, 1991

*Attest:*

HARRY F. MANBECK, JR.

*Attesting Officer*     *Commissioner of Patents and Trademarks*